US011491911B1

(12) United States Patent
Fowler

(10) Patent No.: US 11,491,911 B1
(45) Date of Patent: Nov. 8, 2022

(54) CLIENT ID SCREEN DEVICE FOR COMMUNICATING VALIDATION MESSAGES BETWEEN A VEHICLE AND A PEDESTRIAN

(71) Applicant: Fowler Technologies, LLC., Lake Worth, FL (US)

(72) Inventor: Dale Fowler, Lake Worth, FL (US)

(73) Assignee: Fowler Technologies, LLC, Lake Worth, FL (US)

( * ) Notice: Subject to any disclaimer, the term of this patent is extended or adjusted under 35 U.S.C. 154(b) by 455 days.

(21) Appl. No.: 16/794,831

(22) Filed: Feb. 19, 2020

Related U.S. Application Data

(60) Provisional application No. 62/863,796, filed on Jun. 19, 2019.

(51) Int. Cl.
*H04N 5/44* (2011.01)
*B60Q 1/50* (2006.01)
*H04W 4/44* (2018.01)
*H04W 4/80* (2018.01)

(52) U.S. Cl.
CPC .............. *B60Q 1/503* (2013.01); *H04W 4/44* (2018.02); *H04W 4/80* (2018.02)

(58) Field of Classification Search
CPC ........... B60Q 1/503; H04W 4/44; H04W 4/80
See application file for complete search history.

(56) References Cited

U.S. PATENT DOCUMENTS

| 7,840,427 | B2 | 11/2010 | O'Sullivan |
| 9,494,938 | B1 * | 11/2016 | Kemler ................. G05D 1/0223 |
| 9,516,460 | B2 * | 12/2016 | Ambrefe, Jr. ......... H04W 4/029 |
| 9,771,018 | B2 | 9/2017 | Fournier et al. |
| 10,069,840 | B2 | 9/2018 | Childress et al. |
| 10,183,616 | B2 | 1/2019 | King |
| 10,223,719 | B2 * | 3/2019 | Schoeffler .......... G06Q 30/0609 |
| 10,325,442 | B2 | 6/2019 | Brinig et al. |
| 10,380,668 | B2 * | 8/2019 | Jung ..................... G06Q 50/30 |

(Continued)

FOREIGN PATENT DOCUMENTS

| CN | 104021656 | 9/2014 |
| CN | 104484995 | 4/2015 |

(Continued)

*Primary Examiner* — Munear T Akki
(74) *Attorney, Agent, or Firm* — Fleit Intellectual Properties Law; Jose Gutman

(57) ABSTRACT

Information processing systems, computer readable storage mediums, and methods for communicating driver validation messages between a driver operated vehicle and a pedestrian client. One method, with a driver operated vehicle wireless device in the driver operated vehicle (DOV), includes wirelessly receiving, by the DOV wireless device, a pedestrian only message including a driver validation code, the driver validation code being anonymous to the driver of the DOV. The DOV wireless device displaying, through a window and visible outside the DOV, the driver validation code during a time interval synchronized to be cotemporaneous with displaying the driver validation code via a pedestrian client mobile device outside of the DOV. A contemporaneous display of the driver validation code on both devices visually validates the driver being authorized to meet a pedestrian client using the pedestrian client mobile device outside of the DOV.

19 Claims, 8 Drawing Sheets

(56) References Cited

U.S. PATENT DOCUMENTS

| | | | |
|---|---|---|---|
| 10,384,597 | B1 | 8/2019 | Kemler et al. |
| 10,417,589 | B2 | 9/2019 | Zhao et al. |
| 10,507,760 | B2 * | 12/2019 | Ferrone .................... B60Q 1/50 |
| 2008/0079600 | A1 | 4/2008 | Yono et al. |
| 2012/0137257 | A1 * | 5/2012 | Lalancette ............. G06Q 30/00 |
| | | | 715/846 |
| 2012/0203599 | A1 | 8/2012 | Choi et al. |
| 2013/0105573 | A1 | 5/2013 | Love et al. |
| 2015/0012310 | A1 | 1/2015 | Shen |
| 2015/0348408 | A1 * | 12/2015 | Demisse ................ G08G 1/017 |
| | | | 340/933 |
| 2018/0373936 | A1 | 12/2018 | Kim et al. |
| 2019/0002000 | A1 | 1/2019 | Van Den Wouwer |
| 2019/0114923 | A1 * | 4/2019 | Matthiesen ............ G08G 1/005 |
| 2019/0139091 | A1 | 5/2019 | He et al. |
| 2019/0139450 | A1 | 5/2019 | Truong et al. |
| 2019/0232860 | A1 | 8/2019 | Ferrone |
| 2019/0366917 | A1 * | 12/2019 | Lee ........................ B60Q 1/503 |

FOREIGN PATENT DOCUMENTS

| | | |
|---|---|---|
| CN | 104901723 | 9/2015 |
| CN | 104104807 | 6/2017 |
| CN | 105976602 | 3/2018 |
| KR | 20050071452 | 7/2005 |
| KR | 20130038315 | 4/2013 |
| KR | 20140016007 | 2/2014 |
| KR | 1655873 | 9/2016 |
| WO | 2007076618 | 7/2007 |
| WO | 2009064219 | 5/2009 |
| WO | 2013108238 | 7/2013 |
| WO | 2017054672 | 4/2017 |

* cited by examiner

FIG. 4

| 402 ID | 404 Date | 406 Driver Valid Code | 408 Driver Valid Code History | 410 Client Private Code | 412 Client Private Code History | 414 Client Rules | 416 Client Config Data | 418 Other Client Data |
|---|---|---|---|---|---|---|---|---|
| | | | | | | | | |
| | | | | | | | | |
| | | | | | | | | |
| | | | | | | | | |

FIG. 5

| 502 ID | 504 Rule Data Parameters | 506 Rule Conditions | 508 Rule Actions | 510 Rule-to-Rule Association(s) | 512 Rule Description |
|---|---|---|---|---|---|
| | | | | | |
| | | | | | |
| | | | | | |
| | | | | | |

FIG. 8
802

| 804 | 806 | 808 | 810 | 812 | 814 | 816 |
|---|---|---|---|---|---|---|
| Message Header | Driver Mobile Device Address | Client ID Screen Mobile Device Short-Range Address | Pedestrian-Only Message Data | Client Private Code | Proximity Indicator Data | Client Mobile Device Short-Range Address & Comm. Parameters |

FIG. 9
902

| 904 | 906 | 908 | 910 | 912 | 914 |
|---|---|---|---|---|---|
| Message Header | Client ID Screen Mobile Device Short-Range Address | Pedestrian-Only Message Data | Client Private Code | Proximity Indicator Data | Client Mobile Device Short-Range Address & Comm. Parameters |

CLIENT ID SCREEN DEVICE FOR COMMUNICATING VALIDATION MESSAGES BETWEEN A VEHICLE AND A PEDESTRIAN

BACKGROUND

The present disclosure generally relates to methods of authenticating driver operated vehicles by pedestrian clients thereof, and more particularly relates to a method and system for communicating vehicle validation messages between a driver operated vehicle and a pedestrian client thereof to enhance safety of the pedestrian client and the driver of the vehicle through identity validation.

Vehicle related services between various types of service providers and their clients are increasingly common in modern society. For example, commercial vehicle ride pickup services (also referred to as on-demand person transportation services) such as a taxi service, a limousine service, UBER, and LYFT, and the like, have become ubiquitous in society. A client may contact such a service to request that a driver operated vehicle pick up a pedestrian client at a first arranged location to provide a ride in the vehicle to a second arranged location. Similarly, ride sharing services and school vehicle pick-ups of students are very common. As another example, food and package delivery services such as provided by commercial delivery service providers like AMAZON, Fed Ex, UPS, and the like, have become a normal part of daily life. A client may contact such a delivery service to request a delivery, and in response the commercial delivery service engages a driver operated vehicle to make the delivery to a pedestrian client at an arranged location.

The use in this disclosure of the terms "pedestrian client", "client", or a like term, is intended to broadly describe a person who is physically outside of a driver operated vehicle which has been arranged to meet the person to provide a service therefor. In certain situations, another person who is a responsible custodian for, or guardian of, the person who will meet the driver operated vehicle, actually makes the arrangement for the person who will meet the driver operated vehicle. The variety of possible services, and service providers, anticipated by this disclosure includes, but is not limited to, the example services and service providers indicated above.

In most instances of the types of services indicated above, there is a logistical arrangement of a meeting location where a driver operated vehicle shall meet a pedestrian client to provide the requested service. At the arranged location where the meeting occurs, there is increasing concern for safety of both the pedestrian client and the driver of the vehicle. Public media sources and social media continue to bring to light increasing number of failed personal safety situations seriously affecting pedestrian clients and drivers of the vehicles. For example, failed personal safety situations can include many different incidents of torts and crimes between drivers and clients, such as, but not limited to, thefts, sexual assaults, kidnappings, and murders.

BRIEF SUMMARY

According to various embodiments, a computer-implemented method is provided for validating a driver of a driver operated vehicle (DOV) as being authorized to meet a pedestrian client outside of the DOV. The method comprises: providing a DOV wireless device, the DOV wireless device being communicatively coupled with a display device including an illuminated display, the display device being mounted inside of, and affixed to, a DOV, the display device being in proximity to a window of the DOV with the illuminated display oriented facing the window, the illuminated display displaying information through the window and outside of the DOV; wirelessly receiving, by the DOV wireless device, an ephemeral driver validation message which includes a driver validation code associated with a driver operating the DOV and a display synchronization signal, the driver validation code being anonymous to the driver; storing in memory of the DOV wireless device the received driver validation code; and displaying, by the DOV wireless device, the driver validation code on the illuminated display during a first time interval synchronized, based on the received display synchronization signal, to be cotemporaneous with a second time interval of displaying the driver validation code via a display of a pedestrian client wireless device, a contemporaneous display of the driver validation code on the illuminated display and on the display of the pedestrian client wireless device visually validating the driver operating the DOV as being authorized to meet a pedestrian client carrying and using the pedestrian client wireless device outside of the DOV.

According to various embodiments, a driver operated vehicle wireless device comprises: a display device including an illuminated display, the display device constructed and arranged for mounting inside of a driver operated vehicle (DOV) in proximity to a window of the DOV, with the illuminated display oriented facing the window, for outwardly displaying information through the window to outside of the vehicle; a wireless communication receiver for receiving messages from one or more wireless networks or links, the messages comprising ephemeral driver validation messages, each ephemeral driver validation message including a driver validation code associated with a driver operating the DOV and a display synchronization signal, the driver validation code being anonymous to the driver; memory for storing information from ephemeral driver validation messages received by the wireless communication receiver; and a processor, communicatively coupled with the memory, the wireless communication receiver, and the display device, the processor, responsive to executing computer instructions, performs operations comprising: wirelessly receiving, with the wireless communication receiver, an ephemeral driver validation message; comparing an address included in the wirelessly received ephemeral driver validation message with a preconfigured address in the DOV wireless device, and thereby determining whether the received ephemeral driver validation message includes information for reception and processing by the DOV wireless device; based on a determination that the received ephemeral driver validation message includes information for reception and processing by the DOV wireless device: storing in the memory a first driver validation code and a first display synchronization signal from the received ephemeral driver validation message; storing a message display trigger condition in memory, based on the first display synchronization signal; and displaying the first driver validation code on the illuminated display during a first time interval synchronized, based on the message display trigger condition, contemporaneous with a second time interval while displaying a second driver validation code via a display of a pedestrian client wireless device, a contemporaneous display of the first driver validation code on the illuminated display, and the second driver validation code on the display of the pedestrian client wireless device, and the first driver validation code visually matching the second driver validation code, visually indicating a validation of the driver operating the DOV as being authorized to meet a pedestrian client carrying and using the pedestrian client wireless device outside of the DOV.

According to various embodiments, in a wireless communication system including a remote server, a pedestrian client mobile device (PCMD) carried by a pedestrian client outside of a driver operated vehicle (DOV), a driver mobile device (DMD) inside of, and in use by a driver of, a driver operated vehicle, and a DOV wireless device mounted inside of the DOV, performing a computer-implemented method for validating the driver of the DOV to the pedestrian client outside of the DOV, the computer implemented method comprising: providing a DOV wireless device comprising a display device including an illuminated display, the display device mounted inside of a driver operated vehicle in proximity to a window of the DOV with the illuminated display oriented facing the window, the illuminated display displaying information through the window to outside of the vehicle and away from any field of view of the driver operating the DOV; wirelessly receiving, with a DMD in use by a driver operating the DOV, a first ephemeral driver validation message transmitted using long range communication over one or more networks from a remote server; wirelessly transmitting, using short range wireless communication from the DMD, a second ephemeral driver validation message corresponding to the wirelessly received first ephemeral driver validation message, the first and second ephemeral validation messages including at least pedestrian only message data, a driver validation code, and a client private code; wirelessly receiving, by the DOV wireless device, the second ephemeral driver validation message received via short range wireless communication from the DMD in use by the driver operating the vehicle, at least the driver validation code and the client private code being relayed by the DMD from the first ephemeral driver validation message to the second ephemeral driver validation message while maintaining at least the driver valid code and the client private code anonymous to the driver operating the DOV; storing in memory of the DOV wireless device the driver valid code and a display synchronization signal from the received second ephemeral driver validation message; and displaying the driver validation code by the illuminated display during a first time interval synchronized, based on the received display synchronization signal in the second ephemeral driver validation message, contemporaneous with a second time interval while displaying the driver validation code via a display of a pedestrian client wireless device, a contemporaneous display of the driver validation code on the illuminated display and on the display of the pedestrian client wireless device visually validating the driver operating the DOV as being authorized to meet a pedestrian client carrying and using the pedestrian client wireless device outside of the DOV.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 4 is a block diagram of an example memory structure shown in tabular form suitable for use by a network operation central system to maintain information related to drivers and their driver mobile devices, clients and their pedestrian client mobile devices, and client ID screen mobile devices, that operate in an example distributed processing system such as illustrated in FIG. 2;

FIG. 5 is a block diagram of an example memory structure shown in tabular form suitable for use by a network operation central system to maintain rules-based information related to one or more of drivers and their driver mobile devices, clients and their pedestrian client mobile devices, and client ID screen mobile devices, that operate in the example distributed processing system such as illustrated in FIG. 2;

FIG. 8 is a block diagram showing an example message that can be transmitted from the network operation central system to one or more driver mobile devices in the example distributed processing system such as illustrated in FIG. 2, according to various embodiments of the present disclosure;

FIG. 9 is a block diagram showing an example message that can be transmitted from a driver mobile device to a client ID screen mobile device in the example distributed processing system such as illustrated in FIG. 2, according to various embodiments of the present disclosure;

DETAILED DESCRIPTION

Figure 1:
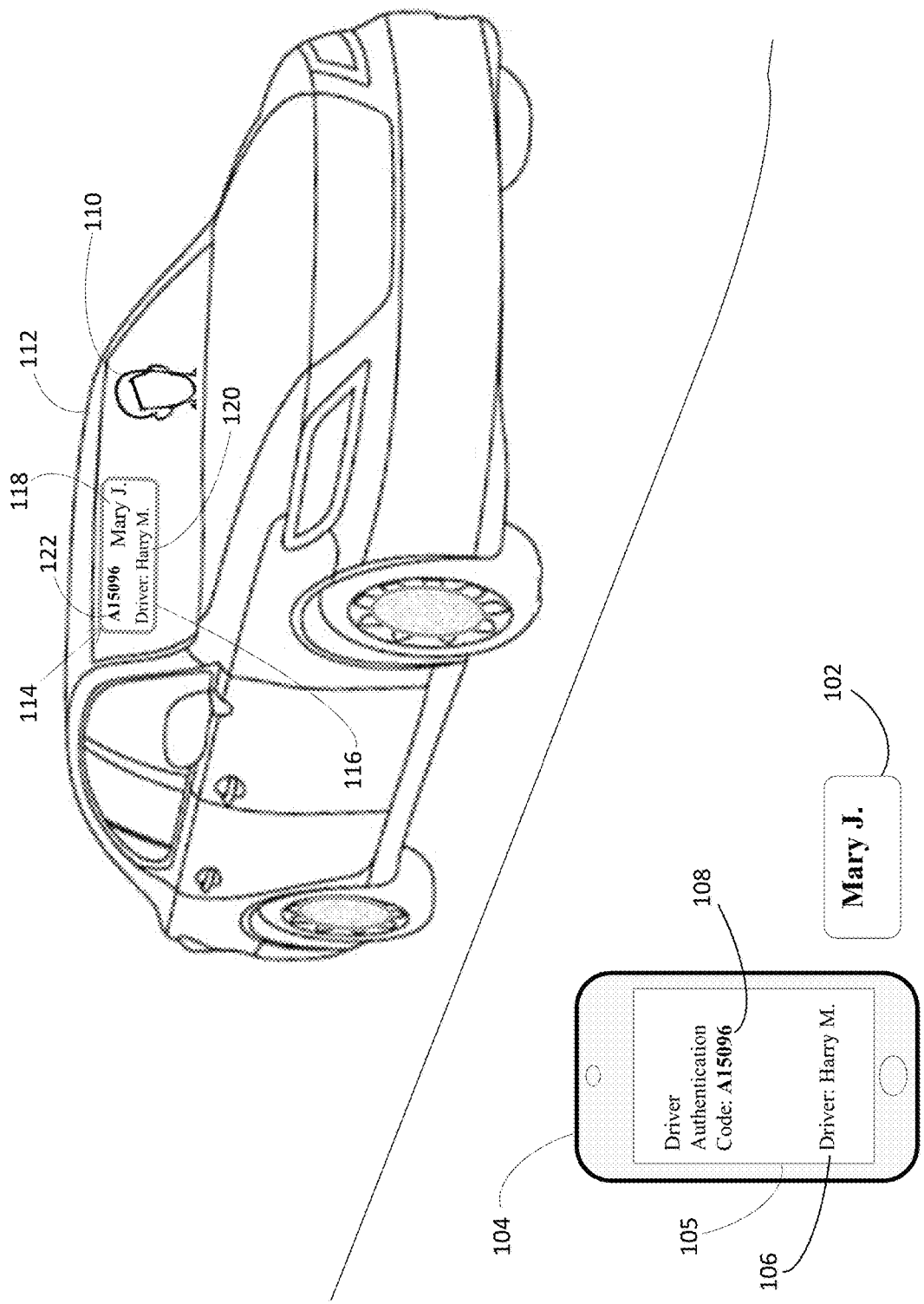
FIG. 1 is a pictorial representation of an example scenario in which a driver operated vehicle is approaching a pedestrian waiting to be picked up by the driver operated vehicle.

It is understood in advance that although this disclosure includes a detailed description related to invention, implementation of the teachings recited herein are not limited to the specific examples shown in the drawings and discussed herein. Rather, embodiments of the present invention are capable of being implemented in many different ways and with many other types of distributed processing environments now known or later developed.

The illustrations of examples discussed herein are intended to provide a general understanding of the structure and function of various embodiments, and they are not intended to serve as a complete description of all the elements and features of devices and systems that might make use of the structures and methods described herein. Many other embodiments will be apparent to those of ordinary skill in the art upon reviewing the description herein.

According to one example embodiment, after arrangement of a meeting location where a driver and driver operated vehicle shall meet a pedestrian client to provide a requested service, a distributed processing and wireless messaging system discussed herein can visually inform the pedestrian client, before entering the driver operated vehicle, whether the driver and their vehicle are authorized by the service provider, such as, but not limited to, UBER or LYFT that provide on-demand transportation services, to meet the pedestrian client at the arranged location.

The pedestrian client uses their pedestrian client mobile device to see a driver validation code displayed by the device. This driver validation code is anonymous to the driver of the driver operated vehicle searching to meet the pedestrian client. The pedestrian client, while outside of the vehicle, can also see information (including a driver validation code) displayed by a wireless device inside of the vehicle. This wireless device is also referred to as a client ID screen wireless device. When the pedestrian client sees the driver validation code displayed by both the client ID screen wireless device inside of the vehicle and by the pedestrian client mobile device outside of the vehicle, it confirms validation of the driver and vehicle as authorized to meet the pedestrian client at the arranged location to provide the arranged service. This confirmation is completed before the pedestrian client meets the driver of the vehicle (e.g., before the pedestrian client enters the driver operated vehicle).

A discussion of various example embodiments will be provided below illustrating in more detail several examples. The examples discussed below are read in view of all of the drawing figures which may be individually referenced at times in the discussion below to highlight particular information being discussed.

Example Operational Sequence for Information Processing Systems

Figure 2:
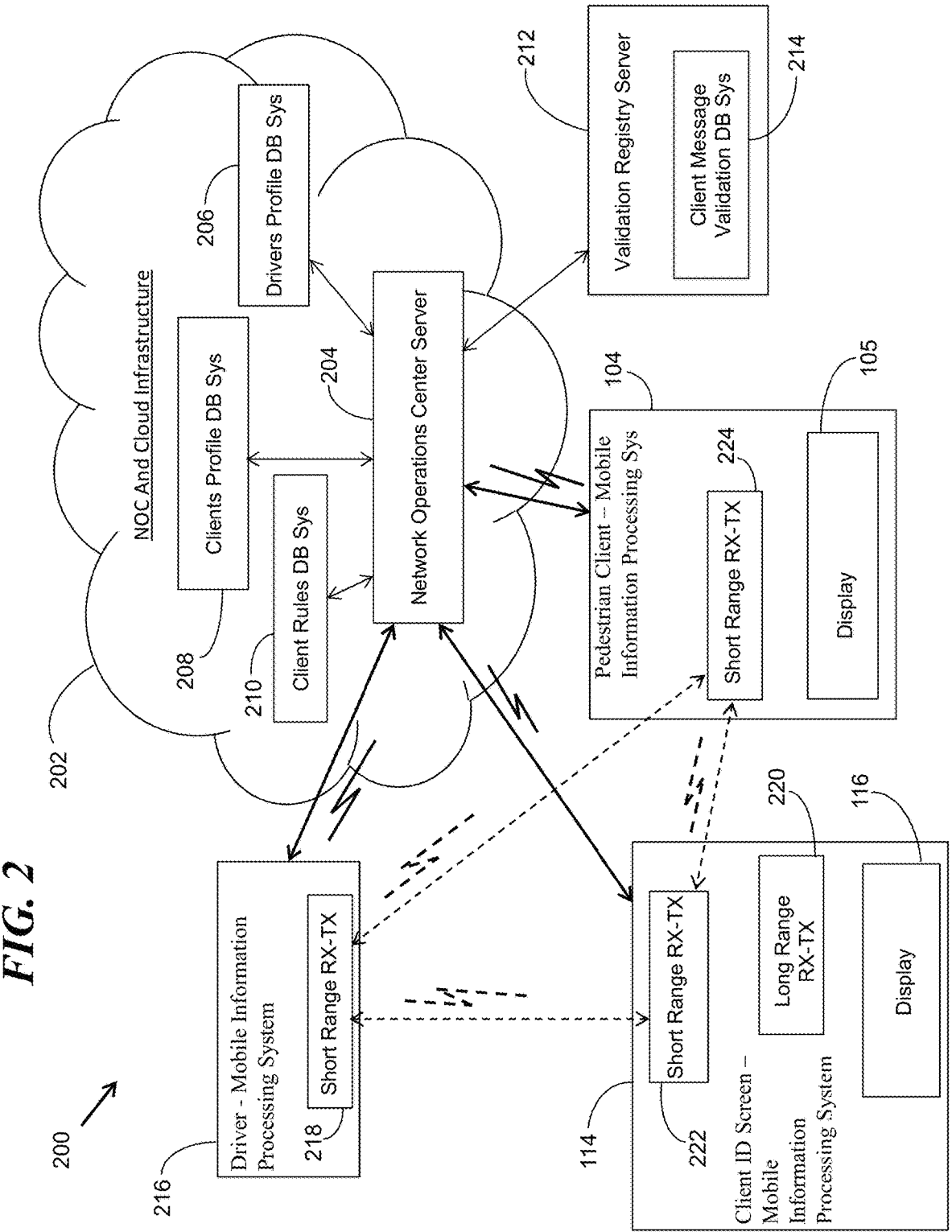
FIG. 2 is a block diagram illustrating an example of a distributed processing system including a communication network, a network operation central system, a driver mobile device, a pedestrian client mobile device, and a client ID screen mobile device, according to various embodiments of the present disclosure.
Figure 6:
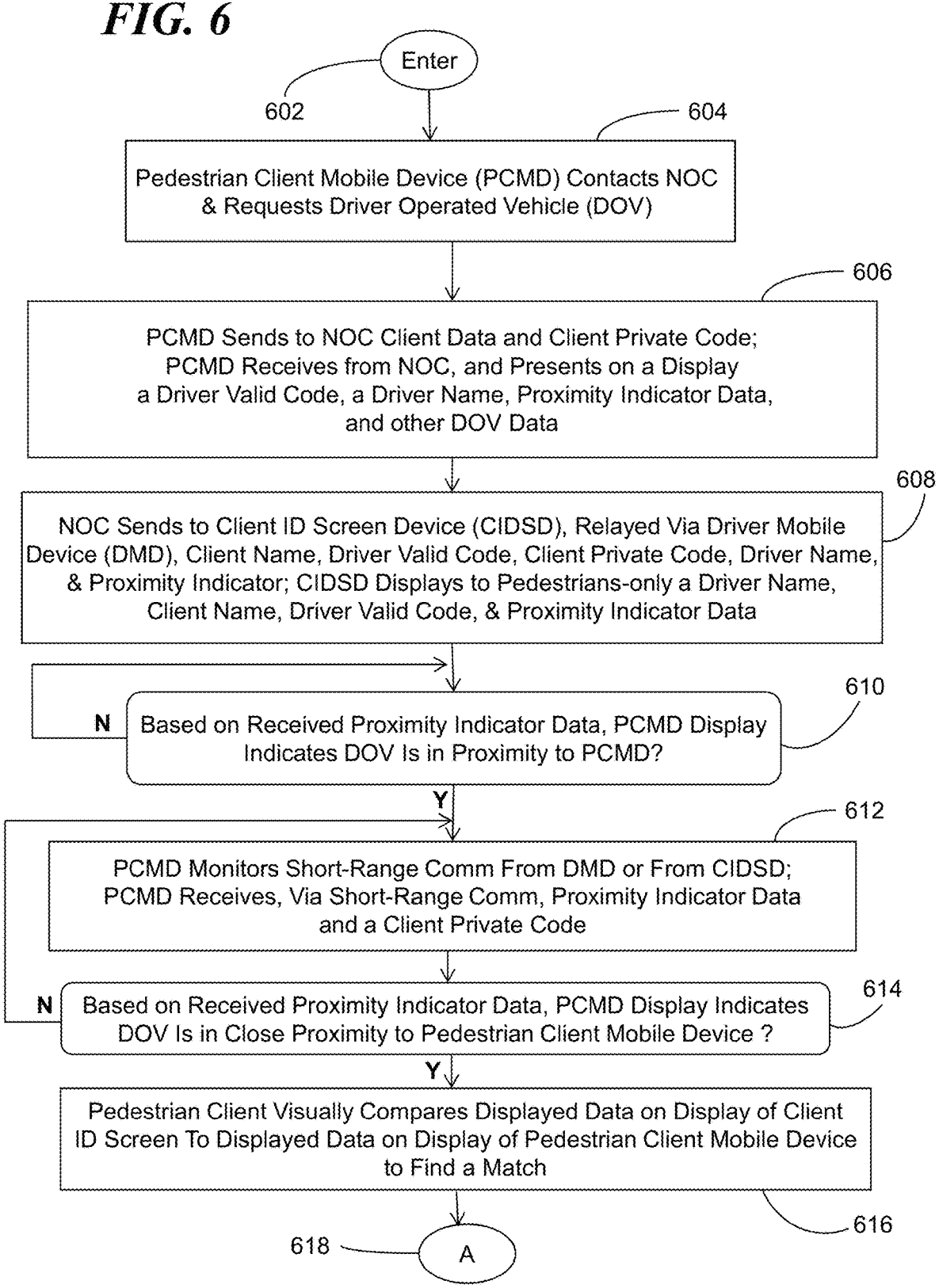
FIGS. 6 and 7 together form an example operational sequence for information processing systems that operate in the example distributed processing system such as illustrated in FIG. 2, according to various embodiments of the present disclosure.
Figure 7:
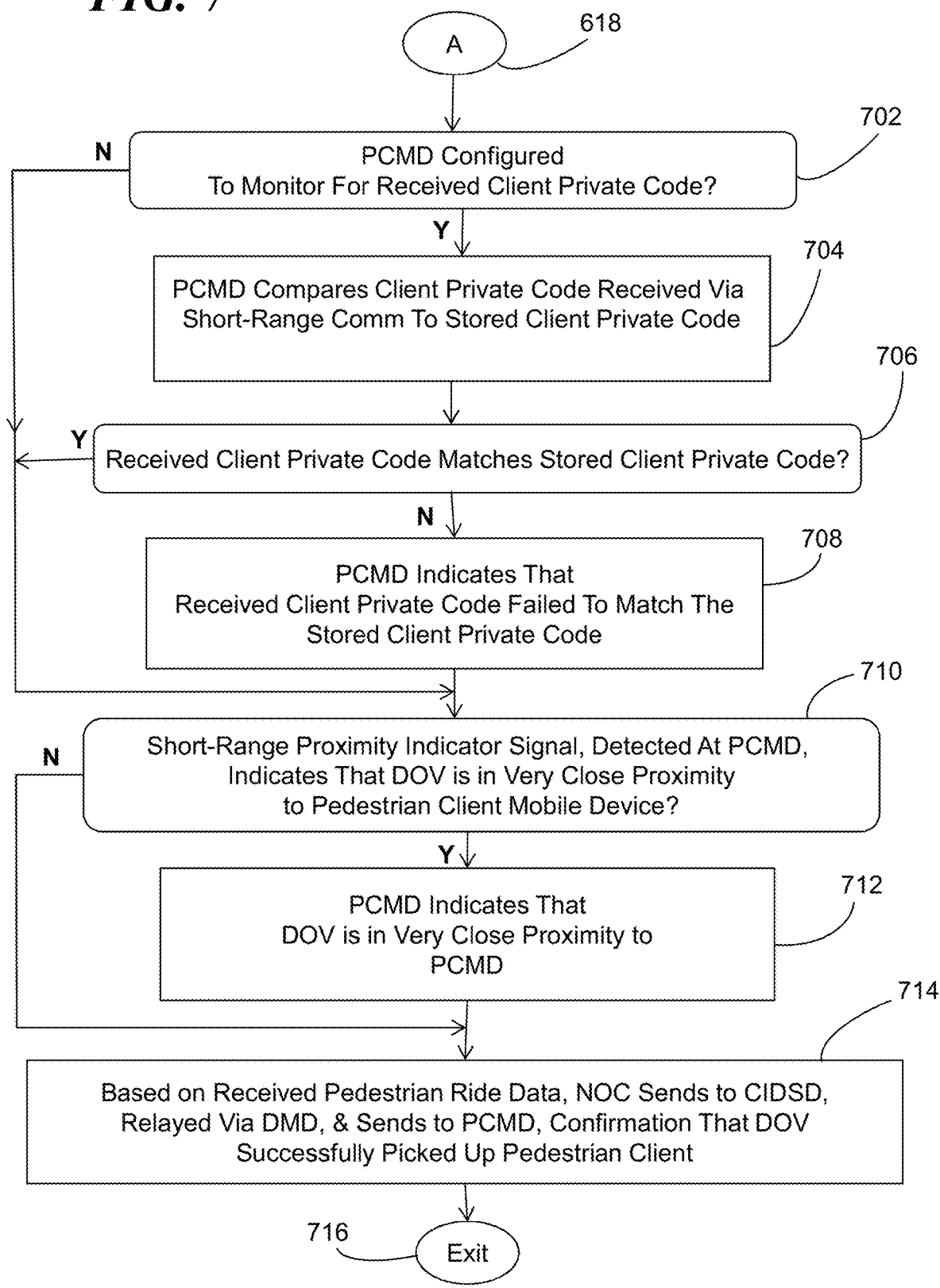
Figure 10:
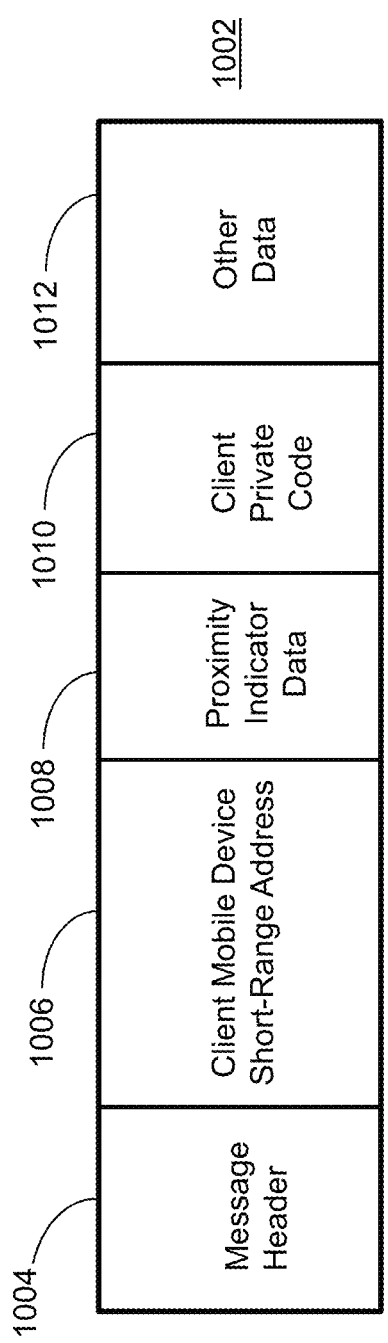
FIG. 10 is a block diagram showing an example message that can be transmitted from a driver mobile device or a client ID screen mobile device to a pedestrian client mobile device in the example distributed processing system such as illustrated in FIG. 2, according to various embodiments of the present disclosure.
Figure 11:
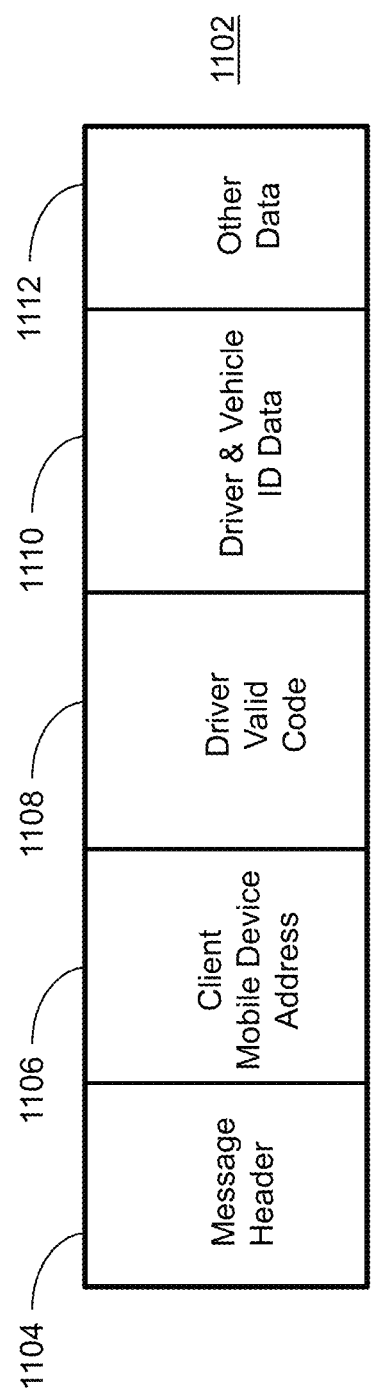
FIG. 11 is a block diagram showing an example message that can be transmitted from the network operation central system to one or more pedestrian client mobile devices in the example distributed processing system such as illustrated in FIG. 2, according to various embodiments of the present disclosure.

FIGS. 6 and 7 illustrate an example operational sequence that may be performed with information processing systems operating in the example distributed processing system 200 illustrated in FIG. 2.

The example operational sequence is entered, at step 602, and then a pedestrian client mobile device (also referred to as PCMD) 104 operates based on a client user application (user app) in the PCMD 104 to establish a communication session, at step 604, with a network operations center server (also referred to as NOC) 204. According to this example, a server-side application in the NOC 204 can interoperate, in the communication session, with the user app in the PCMD 104. Thereby, the user app in the PCMD 104 requests that a driver operated vehicle (also referred to as DOV) meet the pedestrian client 102 at an arranged location. In this example, the arrangement is for a driver operated vehicle 112 to meet and pick up the pedestrian client 102 at a first arranged location to provide a ride to (e.g., transport) the client 102 to a second arranged location. The PCMD 104, based on operation of the client user app, transmits to the NOC 204, at step 606, pedestrian client data such as a pedestrian client name or nickname, parameters for the requested ride for the client 102, and other client information.

Additionally, in this example, the PCMD 104, based on operation of the user app, transmits to the NOC 204 a client private code which is stored in secure memory in the PCMD 104 and stored by the NOC 204 in a client private code field 410 in a client record maintained in a client profile database system 208. The client private code, according to the present example, is cryptographically protected at the PCMD 104 using a public key encryption algorithm and the protected client private code is transmitted by the PCMD 104 to the NOC 204. While a public key encryption algorithm is used in the present example, it is understood by those of ordinary skill in the art that there are many other possible forms of cryptographic protection of the client private code information which can be used at the PCMD 104, according to various embodiments.

The NOC 204 transmits, and the PCMD 104 receives from the NOC 204, a driver valid code (also referred to as a driver validation code), a driver name, proximity indicator data indicating the location of the driver operated vehicle relative to the arranged location for pickup, and other driver operated vehicle data. The driver valid code, according to the example, is generated by the NOC 204. At least some of this transmitted information is also stored by the NOC 204 in a client record maintained in the client profile database system 208. For example, the driver valid code can be stored in the driver valid code field 406 of the client record. The PCMD 104 stores in memory the received information from the NOC 204. The PCMD 104 also presents on a display device 105 of the PCMD 104 at least some of the received information. For example, the display device 105 can display the driver name 106 and the driver valid code 108. Other driver operated vehicle data can also be displayed by the display device 105, which might assist the pedestrian client 102 in identifying and validating the driver operated vehicle 112 and the driver 110. For example, a brief description of the driver operated vehicle 112, and its license plate number, may be displayed to assist the pedestrian client 102.

Continuing with the example operational sequence, at step 608, the NOC 204 sends a pedestrian only message 802 to a client ID screen device (CIDSD) 114. The pedestrian only message 802, according to the present example, is transmitted over one or more networks 202 using long range communication from the NOC 204 to a driver mobile device (DMD) 216 in use inside of a vehicle 112 by a driver 110 of the vehicle 112 which a service provider (e.g., an on-demand transportation service such as UBER or LYFT) has arranged to meet the pedestrian client 102 at an agreed passenger pickup location. An instance of the DMD 216 comprises a wireless communication device. The driver 110 is operating the vehicle 112, and the DMD 216, from inside the vehicle 112.

The CIDSD 114 is also inside the vehicle 112. The CIDSD 114, according to the present example, is securely mounted on and affixed to a passenger side visor in the vehicle 112. A display device 116 of the CIDSD 114 has a display screen that is oriented outwardly facing a window or the windshield of the vehicle 112. The display device 116 has its display screen oriented for viewing from a field of view of a pedestrian outside of the vehicle 112, and not for viewing from a field of view of the driver 110 inside the vehicle 112. In this way, information displayed via the display device 116 is intended for viewing only by pedestrians outside of the vehicle, and not for viewing by the driver 110 of the vehicle 112.

According to various embodiments, a driver user app operates in the DMD 216 and can operate as a communication relay of certain messages that are wirelessly received from the NOC 204. The DMD 216, based on operations with the driver user app and outside of any control of the driver 110, wirelessly receives a pedestrian only message 802 from the NOC 204. The pedestrian only message 802 has been wirelessly transmitted from the NOC 204 over one or more networks 202 using long range communication. The one or more networks 202 can include one or more wireless communication networks or links. The DMD 216 includes a long range transceiver (not shown) which the DMD 216 uses for communication over the one or more networks 202. The pedestrian only message 802, according to the example, includes a message header 804, a driver mobile device address 806, a client ID screen mobile device short range address 808, pedestrian only message data 810, a client private code 812, proximity indicator data 814, and a pedestrian client mobile device short range address and associated communication parameters 816.

After receiving the pedestrian only message 802 from the NOC 204, the DMD 216 then transmits (relays) to the CIDSD 114 a pedestrian only message 902 corresponding to the pedestrian only message 802 received from the NOC 204. The user app operating in the DMD 216 uses some of the content in the received pedestrian only message 802 to generate the corresponding pedestrian only message 902 that is transmitted by the CIDSD 114. The corresponding pedestrian only message 902, according to the example, includes a message header 904, a client ID screen mobile device short range address 906, pedestrian only message data 908, a client private code 910, proximity indicator data 912, and pedestrian client mobile device short range address and associated communication parameters 914.

The DMD 216 uses a short range transceiver 218 at the DMD 216 to communicate messages with a short range transceiver 222 at the CIDSD 114. Such messages can include, according to various embodiments, pedestrian only messages from the NOC 204 that are relayed by the DMD 216 to the CIDSD 114.

According to the example, this retransmission (relay) of the pedestrian only messages 802, 902, by the driver user app operating in the DMD 216, is outside of any control of the driver 110. That is, according to the example, the driver 110 has agreed in advance with the service provider (e.g., a service such as UBER or LYFT) to allow pedestrian only messages to be relayed from the NOC 204, via the DMD 216, to the CIDSD 114. These pedestrian only messages are relayed from the NOC 204 to the CIDSD 114 by the driver user app operating in the DMD 216, without any driver 110 control or any driver 110 knowledge of message content of the pedestrian only messages 802, 902.

The CIDSD 114, according to various embodiments, can receive pedestrian only messages from the NOC 204 using different means of communication of these pedestrian only messages. The example described above uses the driver user app operating in the DMD 216 to relay pedestrian only messages 802, 902, from the NOC 204 to the CIDSD 114.

According to certain embodiments the CIDSD 114 includes a long range wireless transceiver 220, or at least a long range wireless communication receiver which can include one or more of the following receivers: a cellular-telephone receiver, a wireless wide area network data receiver, or a selective call radio receiver. The NOC 204 can communicate messages, via long range communication, directly with the CIDSD 114. These messages are communicated between the NOC 204 and the CIDSD 114, independent of communication with the DMD 216. These messages can include pedestrian only messages 902 directed from the NOC 204 to the CIDSD 114. In these embodiments, the messages, including pedestrian only messages 902, that are transmitted from the NOC 204 to the CIDSD 114 using the networks 202 and long range communication, will include a long range address 906 of the CIDSD 114. The CIDSD 114, using the long-range transceiver 220, monitors message communications from the networks 202 and receives messages, such as pedestrian only messages 902, that include a long range address 906 of the CIDSD 114.

Continuing with the example operational sequence, at step 608, the pedestrian only messages 902, whether received by the CIDSD 114 directly from the NOC 204 or received via relay communication using the DMD 216, contain information for use by the CIDSD 114 such as a client private code 910, proximity indicator data 912, and pedestrian only message data 908 for display on the screen of the display device 105 of the CIDSD 114. The pedestrian only message data 908 can include a pedestrian client name, a driver name 106, a driver valid code (also referred to as a driver validation code) 108, and the like.

Based on proximity indicator data received by the PCMD 104 from the NOC 204, such as, but not limited to, geolocation data associated with the DMD 216, access point ID data of access points in a proximate vicinity to the DMD 216, and other similar DMD 216 geolocation data collected by the NOC 204, the PCMD 104, at step 610, presents on a display 105 of the PCMD 104 indication that the DOV 112 is in proximity to the PCMD 104. This displayed proximity indication can be any symbol, including but not limited to, one or more colors that indicate to a pedestrian client 102 that the DOV 112 is in an estimated proximity to the pedestrian client 102.

For example, a proximity indication can use a displayed color sequence, such as starting with a RED color being displayed (e.g., as a background color) on the display 105 of the PCMD 104 to indicate that the CIDSD 114 (and accordingly the DOV 112) is within a first distance from the PCMD 104. The proximity indication color sequence, after displaying RED color, can follow by displaying a YELLOW color (e.g., as a background color) to indicate that the CIDSD 114 (and accordingly the DOV 112) is within a second distance which is closer to the PCMD 104 than the first distance. Then, the proximity indication color sequence, after displaying YELLOW color, can follow by displaying a GREEN color (e.g., as a background color) to indicate that the CIDSD 114 (and accordingly the DOV 112) is within a third distance which is closer to the PCMD 104 than the second distance. Finally, the proximity indication color sequence may flash the GREEN color ON-OFF continuously to indicate that the CIDSD 114 (and accordingly the DOV 112) is very close to the PCMD 104.

The pedestrian client 102 is alerted by the proximity indication on the display 105 (e.g., the RED color background) to more carefully observe vehicles that are visible in a proximate vicinity to the pedestrian client 102. The pedestrian client 102 is now engaged in visually searching to identify the DOV 112 that is authorized to meet with the pedestrian client 102 at the arranged pickup location.

According to various embodiments, the PCMD 104 also begins to monitor short range communication signals based on the received proximity indicator data received by the PCMD 104 from the NOC 204. The DMD 216, in these example embodiments and based on proximity indicator data received by the DMD 216 from the NOC 204, begins to transmit over one or more short range communication channels an identification signal that can be received by the PCMD 104 to identify that the DMD 216 is in close proximity to the PCMD 104.

Alternatively, according to various embodiments, the CIDSD 114, in these example embodiments and based on proximity indicator data received by the CIDSD 114 from the NOC 204, begins to transmit over one or more short range communication channels an identification signal that can be received by the PCMD 104 to identify that the CIDSD 114 is in close proximity to the PCMD 104.

In certain embodiments, both the DMD 216 and the CIDSD 114 begin to transmit over one or more short range communication channels respective identification signals that can be received by the PCMD 104 to identify that at least one of the DMD 216 or the CIDSD 114 is in close proximity to the PCMD 104.

Based on received respective identification signals that are received by the PCMD 104 from either the DMD 216 or the CIDSD 114, the PCMD 104, at step 612, can receive via short range wireless communication proximity indicator data and a client private code from one of the DMD 216 or the CIDSD 114.

In certain embodiments, the PCMD 104 only establishes a communication session with the CIDSD 114, and not with the DMD 216. By limiting two-way short range communication of the PCMD 104 to the CIDSD 114, it can enhance the privacy and security of the pedestrian client 102 using the PCMD 104. Identification of the PCMD 104 by the DMD 216 using short range communication with the PCMD 104 can be avoided in these embodiments. The PCMD 104 identifies itself to the CIDSD 114 to establish the short range communications between the PCMD 104 and the CIDSD 114, while avoiding sending short range communication identification information of the PCMD 104 to the DMD 216.

The PCMD 104, at step 614, then presents on a display 105 of the PCMD 104 a proximity indication (e.g., the YELLOW color background) that the DOV 112 is in close proximity to the PCMD 104. The pedestrian client 102 is now alerted by the proximity indication on the display 105 to more carefully observe vehicles that are visible in a proximate vicinity to the pedestrian client 102. Based on seeing the proximity indication on the display 105 of the PCMD 104, the pedestrian client 102 visually searches for information displayed on a screen of a display device 116 of a CIDSD 114 in a nearby vehicle.

According to various embodiments, the pedestrian only messages (also referred to as ephemeral driver validation messages) 802, 902, can include a display synchronization signal that can provide an indication of when the CIDSD 114 starts displaying on the screen of the display device 116 the pedestrian-only message data 810, 908. Optionally, the display synchronization signal can provide an indication of when the CIDSD 114 ends display on the screen of the display device 116 of the pedestrian-only message data 810, 908. The display synchronization signal can be part of the pedestrian only message data 802, 902, in the pedestrian only messages 802, 902, it can be a separate control data signal (not shown) in the pedestrian only messages 802, 902, or it can be part of the message header information 804, 904. The pedestrian-only message data 810, 908, according to various embodiments, is intended for the CIDSD 114 to limit the display of the displayable pedestrian-only message data 810, 908, on the screen of the display device 116, to a limited time interval. The displayed pedestrian-only message data 810, 908, is ephemeral to only a limited time interval indicated by the display synchronization signal. That is, the pedestrian only message information is displayed only while the message information is intended to be relevant for the pedestrian client 102 to visually confirm, by looking at the displayed pedestrian only message information, that the driver 110 and the DOV 112 are authorized to meet the pedestrian client at the arranged location to provide the arranged service.

The CIDSD 114, after receiving the pedestrian only message 902, can store the display synchronization signal in memory of the device 114. For example, it can store the display synchronization signal in main memory 302 and/or in the persistent memory 306. Optionally, the CIDSD 114 can store in the memory of the device 114 a message display trigger condition that is based on the display synchronization signal received in the pedestrian only message 902. For example, the display message trigger condition can comprise at least one of the following trigger conditions: 1) an occurrence of a set time as read by the processor from a clock/timer device, 2) a determination by the processor that the DOV wireless device 114 (and accordingly the DOV 112) is substantially located at a set geographic location, 3) a determination by the processor that the DOV wireless device 114 is receiving, or has recently received, one or more geolocation signals, 4) a determination by the processor that the DOV wireless device 114 is in proximity to an access point at a set location, 5) reception, by the DOV wireless device 114, of a wireless communication signal from the pedestrian client wireless device 104; or 6) a combination of any of the above-listed trigger conditions. According to the various embodiments, the DOV wireless device 114 displays the pedestrian only message information (e.g., the driver validation code) on the illuminated display 116 during a time interval that is synchronized, based on the message display trigger condition stored in memory, to a time interval while the pedestrian client wireless device 104 can be displaying the pedestrian only message data (e.g., the driver validation code) via a display 116 of the pedestrian client wireless device 104.

The pedestrian client 102 visually compares, at step 616, first displayed data from a display device 116 of a CIDSD 114 to second displayed data on the display 105 of the PCMD 104, to identify a match of the first displayed data to the second displayed data. After the pedestrian client 102 visually finds a match of the first displayed data to the second displayed data, and particularly finds a match of the driver valid code 122 displayed by the CIDSD 114 to the driver valid code 108 displayed by the PCMD 104, the pedestrian client 102 thereby finds a validation confirmation that the driver 110 and the DOV 112 are authorized to meet the pedestrian client 102 for the pickup service (or to provide any arranged service with a service provider as has been discussed herein).

According to various embodiments, a pedestrian client 102 can create a client private code to be used by the service provider to enhance security of the driver validation process. The pedestrian client 102, according to one example, generates and stores a client private code in the memory of the PCMD 104. The pedestrian client 102 can enter, for example via a user interface of the PCMD 104, a private passcode known only to the pedestrian client 102. Optionally, the pedestrian client 102 can request, via the user interface, that the client user app in the PCMD 104 generate a private passcode for the pedestrian client 102. The private passcode (e.g., the client private code) is then stored in memory in the PCMD 104 for use when the pedestrian client 102 engages the service provider to provide a ride pickup for the pedestrian client 102. According to the example, the client private code is secret data associated only with the particular pedestrian client 102 and the pedestrian client wireless device 104. The client private code at all times remains anonymous (e.g., unknown and unidentifiable) to the driver 110 of the DOV 112. It should be noted that, in various embodiments, the driver valid code included in the pedestrian only messages 802, 902, remains anonymous (e.g., unknown and unidentifiable) to the driver 110 of the DOV 112.

The PCMD 104, based on operation of the client user app, transmits to the NOC 204 pedestrian client data such as a pedestrian client name or nickname, parameters for the requested ride for the client 102, and other client information. This transmitted information can include the client private code created by, or for, the particular pedestrian client 102 and stored in the PCMD 104.

Alternatively, a cryptographically secure form of the client private code may be stored in the PCMD 104 and transmitted from the PCMD 104 to the NOC 204. The client private code can be converted to a cryptographically protected form thereof, for example, by a secure messaging processor using a cryptographic encryption algorithm at the PCMD 104. For example, a public key encryption algorithm, a private key encryption algorithm, or another suitable encryption algorithm known to those of ordinary skill in the art, can be used to convert the client private code to a more secure version of the client private code. In this example embodiment, the client private code can be anonymous to the driver 110 of the DOV 112 and anonymous to the NOC 104 and the service provider. The encrypted client private code adds another layer of security for the pedestrian client 102 to validate the DOV 112 and its driver 112. In the present disclosure, the terms client private code and encrypted client private code, and similar terminology, can be used interchangeably, or can be used as separate terms as understood in the context of a particular discussion.

The PCMD 104 transmits the client private code to the NOC 204, according to one example, at the time of sending a request for a ride pickup for the pedestrian client 102. The NOC 204 then stores the received client private code, in a field 410 of a client record in the client profile database system 208.

The NOC 204, according to various embodiments, can include the client private code in messages transmitted to the CIDSD 114. For example, the NOC 204 can transmit a pedestrian only message 802, 902 to the CIDSD 114, as has been discussed above. According to certain embodiments, the NOC 204 transmits a pedestrian only message 802 to the DMD 216 which then relays (transmits) a corresponding pedestrian only message 902 to the CIDSD 114. In certain embodiments, the NOC 204 transmits a pedestrian only message 902 directly to the CIDSD 114, independent from communication with the DMD 216. The pedestrian only message 802, 902 includes the client private code 812 which can be used by the CIDSD 114 as will be discussed below. The CIDSD 114, according to certain embodiments, includes a secure messaging processor, operatively coupled with the processor in the device, for performing cryptographic operations on information that is included in ephemeral driver validation messages. For example, certain information, such as but not limited to a driver validation code or a client private code can be included in pedestrian only messages 802, 902, in encrypted form such that the information remains anonymous to a driver of a DOV using a DMD, to the NOC 104 and any operation personnel operating the NOC 104, or to both. The CIDSD 114, according to certain embodiments, uses the secure messaging processor to perform cryptographic operations which can decrypt the encrypted information from the pedestrian only messages 802, 902. The CIDSD 114 can display, in some embodiments, certain of the decrypted information on an illuminated display of the device 114.

Continuing with the example operational sequence, with reference to FIG. 7, the PCMD 104 checks configuration parameters stored in memory in the PCMD 104 and determines, at step 702, whether the PCMD 104 is configured to use the client private code feature in communication with the NOC 204 and the CIDSD 114 for a particular request for a ride pickup service.

The PCMD 104, according to various embodiments, can monitor short range communication of messages from the CIDSD 114. If the PCMD 104 detects receipt of transmitted signals from the CIDSD 114, the PCMD 104 establishes a short range communication session with the CIDSD 114, at step 704. The PCMD 104 can then receive from the CIDSD 114 a message 1002 that includes pedestrian only message data such as a client private code 1010 associated with the particular pedestrian client 102. The received message 1002 can include proximity indicator data 1008 that was transmitted from the NOC 204 to the CIDSD 114. This proximity indicator data, or a similar version, was received by the PCMD 104 via a separate message transmitted from the NOC 204 to the PCMD 104.

The CIDSD 114 includes, according to the example, a beacon signal transmitter module (e.g., a short range wireless transmitter module) that transmits, via short range wireless communication, wireless communication signals, which can include messages transmitted from the CIDSD 114 that provide a beacon signal for which the PCMD 104 can monitor and possibly receive messages from the CIDSD 114. These wireless transmissions from the CIDSD 114, which can include messages (that can include in the messages data such as the client private code 1010 and the proximity indicator data 1008) for reception by the PCMD 104 or can include other signals, provide beacon signals to the PCMD 104 to determine general proximity of the CIDSD 114 to the PCMD 104. In certain embodiments, in which the beacon signals are transmitted in a certain direction from the CIDSD 114, the PCMD 104 could determine a general direction from the CIDSD 114 to the PCMD 104 by receiving these beacon signals.

The CIDSD 114 can send to the PCMD 104 the client private code 1010 and the proximity indicator data 1008 in a short range communication message 1002 because the CIDSD 114 has received this information from one or more pedestrian only messages 802, 902, sent by the NOC 204 to the CIDSD 114, as has been discussed above. The NOC 204, for example, can send a pedestrian only message 902 directly to the CIDSD 114 using long-range communication via the long-range transceiver 220 as has been discussed above. The NOC 204 can alternatively send a pedestrian only message 802 to the driver user app in the DMD 216 which then relays a corresponding pedestrian only message 902 to the CIDSD 114. The DMD 216 uses a short range transceiver 218 at the DMD 216 and the CIDSD 114 uses a short range transceiver 222 at the CIDSD 114 to communicate the corresponding pedestrian only message 902 from the DMD 216 to the CIDSD 114.

Continuing with the example operational sequence, with reference to FIG. 7, the PCMD 104 can compare, at steps 704 and 706, the client private code 1010 received from the CIDSD 114 to the client private code stored in memory in the PCMD 104. If the received client private code 1010 fails to match the client private code stored in memory of the PCMD 104, the PCMD 104 can indicate, at step 708, the failed match via a user interface of the PCMD 104. For example, an audible indicator and/or a visual indicator in the user interface can alert a user 102 of the PCMD 104 that the DOV 112 and its driver 110 are not authorized to meet with the pedestrian client 102 the arranged pickup. This may prevent a pedestrian client 102 from inadvertently entering the DOV 112 which is not authorized for the arranged ride pickup.

On the other hand, a successful match of the received client private code 1010 to a stored client private code at the PCMD 104 can be indicated via the user interface (e.g., a displayed symbol on the display 105 of the PCMD 104). This positive indication of a successful match, in combination with the pedestrian client 102 visually matching displayed driver valid codes 108, 122, provides validation to the pedestrian client 102 that the DOV 112 is authorized for the arranged ride pickup.

Continuing with the operational sequence, with reference to FIG. 7, the PCMD 104 can monitor signals transmitted from the CIDSD 114 and received by the PCMD 104, to determine whether a signal quality (quality of service or QoS) threshold has been exceeded. Based on the monitored signals indicating that the signal quality threshold is exceeded, at step 710, the PCMD 104 provides a proximity indication signal via its user interface to alert the user 102 that the authorized DOV 112 and driver 110 are in close proximity to the PCMD 104. For example, an indicator symbol may be presented in the display 105 of the PCMD 104 (e.g., the GREEN color background displayed on the display 105 of the PCMD 104) to alert the pedestrian client 102 that the DOV 112 is in close proximity to the pedestrian client 102.

The PCMD 104 can monitor different types of wirelessly received short range communication signals (e.g., beacon signals) transmitted from the CIDSD 114 to determine a received signal quality and compare it to a threshold value. A comparison of the signal strength of a wirelessly received beacon signal to a first proximity threshold at the PCMD 104 can determine whether the signal strength exceeds the first proximity threshold which indicates the CIDSD 114 is within a first proximity distance from the PCMD 104. By a comparison of the signal strength of a wirelessly received beacon signal to a second proximity threshold that exceed the first proximity threshold, the PCMD 104 can determine whether the signal strength exceeds the second proximity threshold which indicates the CIDSD 114 is within a second proximity distance from the PCMD 104, the second proximity distance being closer to the PCMD 104 than the first proximity distance. A receive signal strength indicator (RSSI) signal from the transceiver 224 is commonly used in wireless communication systems as a means of monitoring received signal strength and quality of communication. While this signal measurement may not always be very accurate for determining proximity of a transmitter of a signal to a receiver of the signal, in short range signaling conditions it may provide sufficient accuracy to indicate close proximity between the transmitter and the receiver of the transmitted signals.

Other signal quality measurements may be used to determine general proximity of the CIDSD 114 to the PCMD 104, as known to those of ordinary skill the art. For example, monitoring the number of dropped message packets in communicating messages between the CIDSD 114 to the PCMD 104 can be used by the PCMD 104 to monitor signal quality. A third example is a number of dropped connections, after establishing communication sessions, can also be used by the PCMD 104 to monitor signal quality. One or more of signal quality measurements such as those discussed above, or in combination with other proximity information such as GPS location coordinate data of the DMD 216, geolocation signal data associated with the DMD 216, and access point ID data of access points in a proximate vicinity to the DMD 216, can be used by the PCMD 104 to determine a general proximity of the CIDSD 114 to the PCMD 104. When the PCMD 104 determines, for example, that a threshold value for signal quality has been met or exceeded, or in combination with other location and proximity information collected at the PCMD 104, the PCMD 104 can indicate in the user interface that there is a very close proximity to the CIDSD 114, and accordingly to the DOV 112. This very close proximity indicator information, such as displayed on the display 105 of the PCMD 104 (e.g., the flashing ON-OFF GREEN color background displayed on the display 105 of the PCMD 104), can additionally help a pedestrian client 102 to identify the DOV 114 from other vehicles that are all in close proximity to the pedestrian client 102.

For example, at an airport there may be many closely spaced vehicles on the street at a pickup location for the pedestrian client 102. It can be difficult for the pedestrian client 102 to determine which of the vehicles is authorized to pick up the pedestrian client 102 to provide the authorized ride service. GPS location data, and other rough (general) location information, may not be sufficiently accurate to be able to distinguish (by a proximity indication) an authorized vehicle from another vehicle in a group of closely spaced vehicles. Also, the pedestrian client 102 may not immediately have a very clear view of the display 116 of the CIDSD 114 inside of one of the vehicles. The pedestrian client 102 may not be able to read a license plate of the authorized DOV 112 to identify the vehicle. Therefore, the additional proximity indication information on the display 105 of the PCMD 104 indicating that the authorized DOV 112 is very close, can alert the pedestrian client 102 to focus their search for the authorized DOV 112 to one or a small group of nearby vehicles that meet other visual identification criteria provided to the pedestrian client 102 (such as vehicle identification information displayed on the display 105 of the PCMD 104).

Example of an Information Processing System

Figure 3:
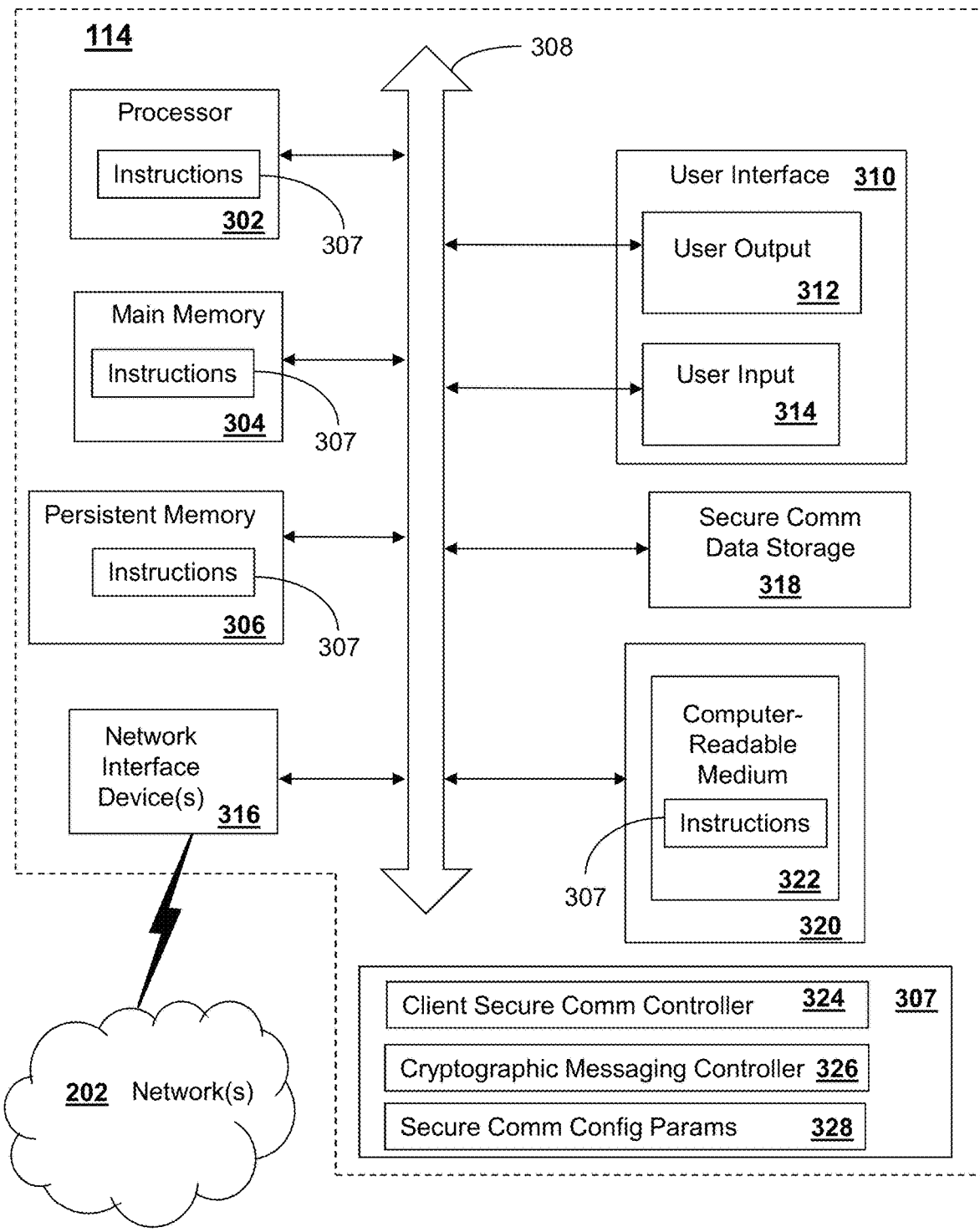
FIG. 3 is a block diagram illustrating an example information processing system suitable for performing novel methods and operational sequences that include the client ID screen mobile device of FIG. 2, in accordance with various embodiments of the present disclosure.

FIG. 3 illustrates an example of an information processing system suitable for use in the distributed processing system 200 illustrated in FIG. 2. The information processing system 113 in FIG. 3 represents an example of a CIDSD 114. As shown in FIG. 3, the information processing system 114 is communicatively coupled with the networking environment 202 shown in FIG. 2, which can include one or more networks and one or more cloud computing systems.

According to this example, at least one processor 302, responsive to executing instructions 307, performs operations to communicate with the NOC 204 as has been discussed above. The at least one processor 302 is communicatively coupled with main memory 304, persistent memory 306, and a computer readable medium 320.

The computer readable medium 322, according to the present example, is communicatively coupled with a reader/writer device 320 that is communicatively coupled via a bus architecture 308 with the at least one processor 302. The instructions 307 can include instructions 324 for the processor 302, instructions 326 for a cryptographic message controller 302 (which in certain embodiments may be one of the one more processors 302), and configuration parameters and data 328. The instructions 307 can be stored in the computer readable medium 322, in the main memory 304, in the persistent memory 306, and in the processor's internal memory such as cache memory and registers, as shown in FIG. 3.

The information processing system 114 includes a secure communication data storage repository which maintains and updates as necessary communication information associated with the messages that the CIDSD 114 communicates with other information processing systems in the in the distributed processing system 200. For example, the CIDSD 114 can store a message history of messages exchanged with the NOC 204. It can also store a message history of messages that the CIDSD 114 exchanged with various DMD's 216. It can further store a message history of messages the CIDSD 114 exchanged with various PCMD's 104. This storage repository 318 in the CIDSD 114 can be securely reviewed by the service provider operating the NOC 204 and its support staff. For example, an incident related to operation of a particular DOV 112 and its drivers 110 and clients 102 can be reviewed by system administrators of the NOC 204.

The information processing system 114 includes a user interface 310 that comprises a user output interface 312 and user input interface 314. Examples of elements of the user output interface 312 can include any one or more of a display 116, a speaker, one or more indicator lights, or one or more transducers that generate audible indicators. Examples of elements of the user input interface 314 can include a keyboard, a keypad, a mouse, a track pad, a touch pad, a microphone that receives audio signals. The received audio signals, for example, can be converted to electronic digital representation and stored in memory of the CIDSD 114, and optionally can be used with voice recognition software executed by the processor 302 to receive user input data and commands for the CIDSD 114.

One or more network interface devices 316 are communicatively coupled with the processor 302 via the bus 308. The network interface devices 316 provide a communication interface for the information processing system 114 to communicate via one or more networks or links. For example, the processor 302 can communicate messages via the network interface devices 316, and the one or more networks or links, with the NOC 204, with the DMD 216, and with the PCMD 104, as has been discussed above.

The networks or links 202 can include wired and wireless networks or links, and can be any of local area networks, wide area networks, or a combination of such networks. For example, wide area networks including the internet and the web allow the information processing system 114 to communicate with other one or more information processing systems that may be locally, or remotely, located relative to the information processing system 114. It should be noted that mobile communications devices, such as mobile phones, Smart phones, tablet computers, lap top computers, and the like, which are capable of at least one of wired and/or wireless communication, are also examples of information processing systems within the scope of the present disclosure.

The instructions 307, according to the present example, include instructions for a client secure communication controller 324 that facilitates communication of the pedestrian only messages between the NOC 204 and the CIDSD 114. The instructions 307, in the example, also include instructions for a cryptographic messaging controller 326 that can operate according to cryptographic algorithms and securely encrypt/decrypt and store data in the CIDSD 114. The instructions 307, in the example, also include configuration parameters and data related to the various controllers 302, 324, 326. It should be noted that, according to various embodiments, any portion of the instructions 307 can be stored in a centralized information processing system or can be stored in a distributed information processing system, i.e., with portions of the system distributed and communicatively coupled together over one or more communication links or networks. The instructions 307 can be downloaded to the CIDSD 114, such as from the NOC 204, as needed for use by the CIDSD 114.

Example of a Distributed Processing System

A network operations center server (NOC) 204 is part of an information processing system that can be located centrally, or can be distributed with communicatively coupled information processing systems in a distributed processing system and network 202. The NOC 204 is communicatively coupled, according the present example system, with a database system 206 that maintains information associated with individual drivers 110 and DOV's 112.

The NOC 204 is communicatively coupled, according the example, with a database system 208 that maintains information associated with clients of the service provider operating the NOC 204. These clients include pedestrian clients 102. In the example, the client database system 208 maintains the client related information in individual data base records associated with respective individual clients. Each record includes fields of information associated with a particular client, as shown in FIG. 4. The fields of each record include, for example, a client record ID 402 and a date 404 when the client record was entered in the database system.

Each record also includes a driver valid code 406 which is currently associated with the particular client and a driver valid code history 408 that keeps track of a number of most recently used driver valid codes. This history helps the system avoid repeating driver valid codes too soon after use with any particular client.

Each record, according to certain embodiments, also includes a client private code 410 which is currently associated with the particular client and a client private code history 412 that can keep track of a number of most recently used client private codes. This history helps the system avoid repeating client private codes too soon after use with any particular client.

In certain embodiments, a trusted validation registry server (Registry) 212 can maintain secure and encrypted records in a database system 214. A user (e.g., a pedestrian client) can store in the Registry 212, for example, the user's client private code which is encrypted and securely stored in the Registry 212. The PCMD 104 can communicate with the Registry 212 to upload a client private code for the user 102, or to request that a unique client private code for the user 102 be generated and stored in the Registry 212. The Registry 212 is a trusted validation resource on the Internet that handles complex (and processor intensive) cryptographic and secure operations and messaging with the NOC 104 on behalf of the PCMD 104. This Registry 212 can remove a burden from the PCMD 104 and the pedestrian user 102, from having to generate and encrypt the client private codes, and to decrypt and validate the client private codes which are used for validation of drivers 110 and DOV's 112.

In these embodiments, the PCMD 104 sends a request to the Registry 212 to create a secure record of a client private code in the Registry 212, for use by the PCMD 104 in association with a particular request for a pickup service by a DOV 112. When the pedestrian client 102 sends a request to the NOC 204, requesting that a DOV 112 pick up the pedestrian client 102 at an arranged location, the PCMD 104 also sends a request to the Registry 21 to send to the NOC 204 the encrypted client private code associated with the pedestrian client 102 for this particular request for a pickup service by a DOV 112.

The NOC 204 is also notified by the PCMD 104 that the pedestrian client 102 has requested that the NOC 204 use the Registry 212 to receive the client private code for validation of the particular driver 110 and DOV 112. The NOC 204 then sends to the Registry 212 a request for, and receives in response, a securely encrypted client private code associated with the particular pedestrian client 102 for this particular ride pickup service.

When the PCMD 104 receives, at step 704, the securely encrypted client private code 1010 in the pedestrian client only message 1002, the PCMD 104 forwards the securely encrypted client private code in a message sent to the Registry 212 and requesting that the Registry 212 independently validate the client private code. The Registry 212 then handles the complex cryptographic operations to decrypt the received securely encrypted client private code 1010 from the pedestrian client only message 1002 and to compare the decrypted client private code to the version of the client private code that was previously stored in the Registry 212. If the Registry 212 finds that there is a match between the two versions of the client private code, the Registry 212 sends a successful match confirmation message to the PCMD 104. The PCMD 104 then presents on the display 105 a successful match confirmation message which the pedestrian client 102 can see and be assured that the DOV 112 and driver 110 are authorized for the arranged ride pickup. However, if the Registry 212 fails to find a match between the two versions of the client private code, the Registry 212 sends a failed match confirmation message to the PCMD 104. The PCMD 104 then presents on the display 105 an alert message to notify the pedestrian client 102 that the DOV 112 and driver 110 are authorized for the arranged ride pickup. The pedestrian client 102 is alerted well before the pedestrian client 102 physically enters the wrong (unauthorized) vehicle 112.

Returning to the discussion of the client database system 208 that maintains the client related information, with reference to FIG. 4, each record may also include client configuration data which identifies the configuration of the PCMD 104 of each client to allow the NOC 204 to exchange messages with the PCMD 104 according to the configuration of the PCMD 104 of each particular client. Other client related data 418 may also be stored in the each record in the database 208.

The NOC 204 is communicatively coupled, according certain embodiments, with a database system 210 that maintains rules associated with clients of the service provider operating the NOC 204. Each record in the client profile database system 208 includes a set of pointers 414 to one or more rules in the rules database system 210. The pointed to set of rules in the rules database system 210 are associated with the particular client record. The information in the client rules database system 210 is organized with records for each particular rule and a set of fields in the each record that provide specific rule related information for the NOC 204 to use for managing client relationships with the service provider operating the NOC 204. Each rule record in the rule database system 210 includes a record ID 502 and data and parameters 504 associated with the particular rule. Each rule record also includes a description of the rule 512.

Each rule record also includes a set of rule conditions 506 and a set of rule actions 508 that together can define a rule state machine for the NOC 204 to operate to completion, based on the set of rule conditions 506, a sequence of the set of rule actions. Additionally, each rule may include a set of rule-to-rule associations 510 such that a particular rule, and its set of conditions and actions, can be dependent on a second particular rule, and its set of conditions and actions, in the rules database 210. In this way, the NOC 204 can follow, and operate according to, a complex set of rules (and their particular rule conditions and rule actions) from the rules database 210 for a particular client of the service provider operating the NOC 204.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, which may include, but not limited to, one or more wired or wireless networks, and which may further include a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the invention. It will be understood that each block of the flowchart illustrations and/or block functional diagrams, and combinations of blocks in the flowchart illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any Real-time Operating System (ROS) and/or an operating system based on any of the Linux, UNIX, Windows, and Windows Server operating systems and architectures. Various embodiments are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device which may also be referred to as a wireless device or a wireless communication electronic device, a personal digital assistant, a workstation, and the like, are processing systems which may also be referred to as information processing systems. A processing system may include one or more processing systems or processors. A processing system can be realized in a centralized fashion in one processing system or in a distributed fashion where different elements are spread across several interconnected processing systems.

The term "window" is intended to broadly mean a window or a windshield (also referred to as a front window) of a vehicle.

The terms "ephemeral driver validation message" and "pedestrian only message", or a similar term used herein, are intended to mean a message including a driver validation code. The terms "driver validation code" or "driver valid code" are intended to mean a temporary data value that is associated with a particular driver and a driver operated vehicle which is operated by the driver. The association of the temporary data value with the driver and the driver operated vehicle is for a limited time during which the driver and the driver operated vehicle are authorized to meet a particular pedestrian client.

The terms "driver wireless device", "driver mobile device", "DMD", or a similar term used herein, are intended to mean a wireless device used by a driver in a driver operated vehicle which is operated by the driver.

The terms "driver operated vehicle wireless device", "DOV wireless device", "client ID screen device", "CIDSD", or a similar term used herein, are intended to mean a particular wireless device mounted on, and affixed to, a driver operated vehicle which is operated by a driver. The particular wireless device comprises, and/or is communicatively coupled with, a display device that is mounted on, and affixed to, the driver operated vehicle. The wireless device and/or the display device, according to various embodiments, may include at least one of the following: one or more clips, one or more clamps, one or more suction cups, or one or more hook-and-loop straps, which affix and mount the wireless device and/or the display device to at least one of a visor inside of a driver operated vehicle, an inside surface of a front windshield window of the vehicle, an inside surface of a side window of the vehicle, an inside surface of a rear window of the vehicle, or a top surface of a front dashboard/console of the vehicle.

The terms "pedestrian client wireless device", "pedestrian client mobile device", "pedestrian wireless device", "pedestrian mobile device", "PCMD", or a similar term used herein, are intended to mean a wireless device being carried and used by a pedestrian client.

The terms "short range wireless transceiver", "short range wireless communication", or a similar term used herein, are intended to broadly mean at least one short range wireless transceiver selected from the following group: a Bluetooth radio transceiver configured to operate according to any of the Bluetooth communication standards, a Wi-Fi radio transceiver configured to operate according to any of the Wi-Fi communication standards, a Near-Field Communication (NFC) active transceiver configured to operate according to any of the NFC communication standards (e.g., using NFC peer-to-peer communication), or another short range wireless transceiver and related short range communication standards as understood by those of ordinary skill in the art.

The terms "long range wireless transceiver", "long range wireless communication", or similar terms used herein, are intended to broadly mean at least one long range wireless transceiver used in wireless communication systems for wireless communication with wireless communication devices such as, for example and not for limitation, smart phones, mobile phones, wireless modem enabled devices and processing systems, or the like.

Terms used herein that include "wireless transceiver" can support one or more short range and/or long range wireless communication technologies, as understood in context of use of the particular term, such as Bluetooth, ZigBee, Wi-Fi, NFC, Digital Enhanced Cordless Telecommunications (DECT), or cellular communication technologies, just to mention a few. Cellular communication technologies can include, for example, code division multiple access-1× (CDMA-1×), Universal Mobile Telephone System/High Speed Downlink Packet Access (UMTS/HSDPA), Global System for Mobile/General Packet Radio System (GSM/GPRS), time division multiple access/Enhanced Data GSM Environment (TDMA/EDGE), Evolution Data Optimized (EV/DO), Worldwide Interoperability for Microwave Access (WiMAX), Software Defined Radio (SDR), Long Term Evolution (LTE), as well as other next generation wireless communication technologies as they arise. A wireless transceiver can also be configured to support circuit-switched wireline access technologies (such as Public Switched Telephone Network (PSTN)), packet-switched wireline access technologies (such as Transmission Control Protocol/Internet Protocol (TCP/IP), Voice over Internet Protocol (VoIP), etc.), and combinations thereof.

The terms "geolocation information", "geolocation data", or a similar term used herein, are intended to mean data that indicates a physical location of a wireless devices, such as the driver wireless device, the pedestrian client wireless device, or the DOV wireless device. For example, geolocation information can include GPS data received from a GPS receiver in a wireless device. Geolocation information, in a second example, can include sensor data monitored by one or more sensors in the wireless device that indicate the physical location of the device. Geolocation information, in a third example, can include sensor data received by the wireless device from external (external to the wireless device) sensor units in particular locations. Geolocation information, in a fourth example, can include received cellular network signals that indicate the location of the wireless device relative to reference locations of one or more cellular network base station transmitters to generate geo-location data. While the example discussed above uses cellular network signals from cellular network base stations, it should be clear that other communication networks can be used for calculations to generate the geolocation data. For example, communication signals with a one or more Wi-Fi access points or Wi-Fi hotspots with known locations can be used by the wireless device to determine a geolocation for the wireless device. Geolocation information, in a fifth example, can include signal data from a received signal strength indicator (RSSI) circuit in the wireless device that indicates the distance of the wireless device from other one or more signal transmitters that have known locations. Any combination of the above examples can be used in various embodiments to generate the geolocation information.

The Geolocation information can indicate specific location information for the electronic device that is not necessarily determinable from GPS data alone. For example, a plurality of overlapping maps of a particular geographic region may be identified by a combination of geolocation information from various sources. The electronic device's actual location relative to any one of the overlapping maps may be identified by Geolocation information. As a very specific example, a physically secure area (i.e., only authorized personnel permitted access) inside of a business facility can be identified with Geolocation information.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A computer-implemented method for validating a driver of a driver operated vehicle (DOV) to a pedestrian client outside of the DOV, the method comprises:

providing a DOV wireless device, the DOV wireless device being communicatively coupled with a display device including an illuminated display, the display device being mounted inside of, and affixed to, a DOV, the display device being in proximity to a window of the DOV with the illuminated display oriented facing the window, the illuminated display displaying information through the window and outside of the DOV;

wirelessly receiving, by the DOV wireless device, an ephemeral driver validation message which includes a driver validation code associated with a driver operating the DOV and a display synchronization signal, the driver validation code being anonymous to the driver;

comparing an address included in the wirelessly received ephemeral driver validation message with a preconfigured address in the DOV wireless device, and thereby determining whether the received ephemeral driver validation message includes information for reception and processing by the DOV wireless device;

based on a determination that the received ephemeral driver validation message includes information for reception and processing by the DOV wireless device, storing in memory of the DOV wireless device the received driver validation code; and displaying, by the DOV wireless device, the driver validation code on the illuminated display during a first time interval synchronized, based on the received display synchronization signal, to be cotemporaneous with a second time interval of displaying the driver validation code via a display of a pedestrian client wireless device, a contemporaneous display of the driver validation code on the illuminated display and on the display of the pedestrian client wireless device visually validating the driver operating the DOV as being authorized to meet a pedestrian client carrying and using the pedestrian client wireless device outside of the DOV; and wherein the received ephemeral driver validation message includes an encrypted driver validation code and an encrypted display synchronization signal, and wherein the method comprises:

decrypting the encrypted driver validation code and the encrypted display synchronization signal received in the ephemeral driver validation message;

storing a message display trigger condition in memory, based on the display synchronization signal; and displaying the decrypted driver validation code on the illuminated display during a time interval synchronized, based on the message display trigger condition.

2. The computer-implemented method of claim 1, comprising:

wirelessly receiving, by a long range wireless transceiver in a driver wireless device of the driver operating the DOV, a first ephemeral driver validation message which includes a driver validation code associated with the driver operating the DOV and a display synchronization signal, the first ephemeral driver validation message being wirelessly received from a remote server by the long range wireless transceiver via long range wireless communication over one or more networks;

wirelessly transmitting, by a short range wireless transceiver of the driver wireless device using short range wireless communication, a second ephemeral driver validation message which includes a driver validation code and a display synchronization signal based on the driver validation code and the display synchronization signal received in the first ephemeral driver validation message by the driver wireless device;

wirelessly receiving, by a short range wireless transceiver of the DOV wireless device using short range wireless communication, the second ephemeral driver validation message; and displaying, by the DOV wireless device, the driver validation code on the illuminated display during a first time interval synchronized, based on the received display synchronization signal in the second ephemeral driver validation message, contemporaneous with a second time interval while displaying the driver validation code via a display of a pedestrian client wireless device, a contemporaneous display of the driver validation code on the illuminated display and on the display of the pedestrian client wireless device visually validating the driver operating the DOV as being authorized to meet a pedestrian client carrying and using the pedestrian client wireless device outside of the DOV.

3. The computer-implemented method of claim 2, wherein the short range wireless transceiver of the DOV wireless device comprises at least one short range wireless transceiver selected from a group including: a Bluetooth radio transceiver, a Wi-Fi radio transceiver, or a Near-Field Communication active transceiver.

4. A driver operated vehicle wireless device comprising:

a display device including an illuminated display, the display device constructed and arranged for mounting inside of a driver operated vehicle (DOV) in proximity to a window of the DOV, with the illuminated display oriented facing the window, for outwardly displaying information through the window to outside of the vehicle;

a wireless communication receiver for receiving messages from one or more wireless networks or links, the messages comprising ephemeral driver validation messages, each ephemeral driver validation message including a driver validation code associated with a driver operating the DOV and a display synchronization signal, the driver validation code being anonymous to the driver;

memory for storing information from ephemeral driver validation messages received by the wireless communication receiver; and a processor, communicatively coupled with the memory, the wireless communication receiver, and the display device, the processor, responsive to executing computer instructions, performs operations comprising:

wirelessly receiving, by the wireless communication receiver, an ephemeral driver validation message;

comparing an address included in the wirelessly received ephemeral driver validation message with a preconfigured address in the DOV wireless device, and thereby determining whether the received ephemeral driver validation message includes information for reception and processing by the DOV wireless device;

based on a determination that the received ephemeral driver validation message includes information for reception and processing by the DOV wireless device:

storing in the memory a first driver validation code and a first display synchronization signal from the received ephemeral driver validation message;

storing a message display trigger condition in memory, based on the first display synchronization signal; and displaying the first driver validation code on the illuminated display during a first time interval synchronized, based on the message display trigger condition, contemporaneous with a second time interval while displaying a second driver validation code via a display of a pedestrian client wireless device, a contemporaneous displaying of the first driver validation code on the illuminated display, and the second driver validation code on the display of the pedestrian client wireless device, and the first driver validation code visually matching the second driver validation code, visually indicating a validation of the driver operating the DOV as being authorized to meet a pedestrian client carrying and using the pedestrian client wireless device outside of the DOV; and wherein the received ephemeral driver validation message includes an encrypted driver validation code and an encrypted display synchronization signal, and wherein the processor, responsive to executing computer instructions, performs operations comprising:
  decrypting the encrypted driver validation code and the encrypted display synchronization signal received in the ephemeral driver validation message;
  storing a message display trigger condition in memory, based on the decrypted display synchronization signal; and
  displaying the decrypted driver validation code on the illuminated display during a time interval synchronized, based on the message display trigger condition.

5. The driver operated vehicle wireless device of claim 4, wherein the processor, responsive to executing computer instructions, performs operations comprising:
  wirelessly receiving, by a short range wireless transceiver of the DOV wireless device using short range wireless communication, the ephemeral driver validation message;
  storing in the memory a first driver validation code and a first display synchronization signal from the received ephemeral driver validation message;
  storing a message display trigger condition in memory, based on the first display synchronization signal, wherein the message display trigger condition includes at least one trigger condition selected from a group of trigger conditions including:
    occurrence of a set time as read by the processor from a clock/timer device;
    detection by the processor that the DOV wireless device is substantially located at a set geographic location;
    detection by the processor that the DOV wireless device is receiving one or more geolocation signals;
    detection by the processor that the DOV wireless device is in proximity to an access point at a set location;
    reception, by the DOV wireless device, of a wireless communication signal from the pedestrian client wireless device; or
    a combination of any of the trigger conditions listed above; and
  displaying the first driver validation code on the illuminated display during a first time interval synchronized, based on the message display trigger condition stored in memory, contemporaneous with a second time interval while displaying a second driver validation code via a display of a pedestrian client wireless device, a contemporaneous displaying of
    the first driver validation code on the illuminated display, and
    the second driver validation code on the display of the pedestrian client wireless device, and wherein the contemporaneous displayed first driver validation code visually matching the contemporaneous displayed second driver validation code thereby visually indicating a validation of the driver operating the DOV as being authorized to meet a pedestrian client carrying and using the pedestrian client wireless device outside of the DOV.

6. The driver operated vehicle wireless device of claim 4, wherein the first driver validation code is the same as the second driver validation code, and the displaying of the first driver validation code on the illuminated display contemporaneous with the displaying of the second driver validation code on the display of the pedestrian client wireless device visually indicates a validation of the driver operating the DOV as being authorized to meet a pedestrian client carrying and using the pedestrian client wireless device outside of the DOV.

7. The driver operated vehicle wireless device of claim 4, wherein the wireless communication receiver comprises at least one short range wireless transceiver selected from a group including: a Bluetooth radio transceiver, a Wi-Fi radio transceiver, or a Near-Field Communication active transceiver.

8. The driver operated vehicle wireless device of claim 4, wherein the processor, responsive to executing computer instructions, performs operations comprising:
  wirelessly receiving, using short range wireless communication, the ephemeral driver validation message from a driver wireless device in use by the driver of the DOV.

9. The driver operated vehicle wireless device of claim 4, comprising a long range wireless communication receiver selected from a group including: a cellular-telephone receiver, a wireless wide area network data receiver, or a selective call radio receiver; and
  wherein the wirelessly receiving of the ephemeral driver validation message is performed with the long range wireless communication receiver.

10. The driver operated vehicle wireless device of claim 4, comprising a long range wireless transceiver, and wherein the processor, responsive to executing computer instructions, performs operations comprising:
  wirelessly receiving, by the long range wireless transceiver using long range wireless communication over one or more wireless communication networks or links, the ephemeral driver validation message from a remote server.

11. The driver operated vehicle wireless device of claim 4, wherein the illuminated display comprises at least one of a backlight illuminated LCD display or an LED display.

12. The driver operated vehicle wireless device of claim 4, comprising:
  a secure messaging processor, operatively coupled with the processor, for performing cryptographic operations on information that is included in ephemeral driver validation messages.

13. The driver operated vehicle wireless device of claim 12, wherein the received ephemeral driver validation message includes a driver validation code that is encrypted, and wherein the processor, responsive to executing computer instructions, performs operations comprising:
  decrypting the driver validation code received encrypted in the ephemeral driver validation message; and
  displaying the decrypted driver validation code via the illuminated display during a time interval synchronized, based on the message display trigger condition, contemporaneous with a second time interval while displaying a second driver validation code via a display of a pedestrian client wireless device, a contemporaneous display of
    the decrypted driver validation code on the illuminated display, and
    the second driver validation code on the display of the pedestrian client wireless device, and the displayed first driver validation code visually matching the displayed second driver validation code, visually indicating a validation of the driver operating the DOV as being authorized to meet a pedestrian client carrying and using the pedestrian client wireless device outside of the DOV.

14. The driver operated vehicle wireless device of claim 12, comprising:
 a beacon signal transmitter module, communicatively coupled with the processor, wherein the processor, responsive to executing computer instructions, performs operations comprising:
 wirelessly transmitting, by the beacon signal transmitter module, a beacon signal comprising one or more messages that include at least one data selected from the following group: pedestrian only message data, a client private code, or proximity indicator data, associated with the pedestrian client wireless device carried by the pedestrian client outside of the DOV.

15. The driver operated vehicle wireless device of claim 14, wherein the beacon signal transmitter module comprises at least one short range wireless transceiver selected from a group including: a Bluetooth radio transceiver, a Wi-Fi radio transceiver, or a Near-Field Communication active transceiver.

16. The driver operated vehicle wireless device of claim 4, wherein the display device includes at least one member selected from the following group including: one or more clips, one or more clamps, one or more suction cups, or one or more hook-and-loop straps, and wherein the display device is affixed and mounted to at least one of a visor inside of the driver operated vehicle, an inside surface of a front windshield window of the vehicle, an inside surface of a side window of the vehicle, an inside surface of a rear window of the vehicle, or a top surface of a front dashboard/console of the vehicle, with the illuminated display oriented facing a nearest window of the vehicle for displaying information through the nearest window to outside of the vehicle.

17. A computer-implemented method in a wireless communication system including a remote server, a pedestrian client mobile device (PCMD) carried by a pedestrian client outside of a driver operated vehicle (DOV), a driver mobile device (DMD) inside of, and in use by a driver of, a driver operated vehicle, and a DOV wireless device mounted inside of the DOV, the method performed for validating the driver of the DOV to the pedestrian client outside of the DOV, the method comprising:
 providing a DOV wireless device comprising a display device including an illuminated display, the display device mounted inside of a driver operated vehicle in proximity to a window of the DOV with the illuminated display oriented facing the window, the illuminated display displaying information through the window to outside of the vehicle and away from any field of view of the driver operating the DOV;
 wirelessly receiving, with a DMD in use by a driver operating the DOV, a first ephemeral driver validation message using long range communication over one or more networks from a remote server;
 wirelessly transmitting, using short range wireless communication from the DMD, a second ephemeral driver validation message corresponding to the wirelessly received first ephemeral driver validation message, the first and second ephemeral validation messages including at least pedestrian only message data, a driver validation code, and a client private code;
 wirelessly receiving, by the DOV wireless device, the second ephemeral driver validation message using short range wireless communication from the DMD in use by the driver operating the vehicle, at least the driver validation code and the client private code being relayed by the DMD from the first ephemeral driver validation message to the second ephemeral driver validation message while maintaining at least the driver validation code and the client private code anonymous to the driver operating the DOV;
 comparing an address included in the wirelessly received second ephemeral driver validation message with a preconfigured address in the DOV wireless device, and thereby determining whether the received second ephemeral driver validation message includes information for reception and processing by the DOV wireless device;
 based on a determination that the received second ephemeral driver validation message includes information for reception and processing by the DOV wireless device, storing in memory of the DOV wireless device the driver validation code and a display synchronization signal from the received second ephemeral driver validation message; and
 displaying the driver validation code by the illuminated display during a first time interval synchronized, based on the received display synchronization signal in the second ephemeral driver validation message, contemporaneous with a second time interval while displaying the driver validation code via a display of a pedestrian client wireless device in use by a pedestrian client, a contemporaneous displaying of the driver validation code on the illuminated display and on the display of the pedestrian client wireless device visually validating the driver operating the DOV as being authorized to meet the pedestrian client carrying and using the pedestrian client wireless device outside of the DOV; and
 wherein the received second ephemeral driver validation message includes an encrypted driver validation code and an encrypted display synchronization signal, and wherein the method comprises:
 decrypting the encrypted driver validation code and the encrypted display synchronization signal received in the second ephemeral driver validation message;
 storing in memory the decrypted driver validation code and the decrypted display synchronization signal; and
 displaying the decrypted driver validation code on the illuminated display during a time interval synchronized, based on the decrypted display synchronization signal.

18. The computer-implemented method of claim 17, comprising:
 wirelessly transmitting, by the DOV wireless device using short range wireless communication, a beacon signal comprising one or more messages that include at least one data selected from the following group: pedestrian only message data, a client private code, an encrypted client private code, or proximity indicator data, associated with the pedestrian client wireless device carried by the pedestrian client outside of the DOV.

19. The computer-implemented method of claim 17, comprising:
 storing a message display trigger condition in memory, based on the display synchronization signal from the received second ephemeral driver validation message, wherein the message display trigger condition includes at least one trigger condition selected from a group of trigger conditions including:
 occurrence of a set time as read by a processor from a clock/timer device;
 detection by a processor that the DOV wireless device is substantially located at a set geographic location;

detection by a processor that the DOV wireless device is receiving one or more geolocation signals;

detection by a processor that the DOV wireless device is in proximity to an access point at a set location;

reception, by the DOV wireless device, of a wireless communication signal from the pedestrian client wireless device; or a combination of any of the trigger conditions listed above; and displaying the driver validation code by the illuminated display during a first time interval synchronized, based on the message display trigger condition stored in memory, contemporaneous with a second time interval while displaying the driver validation code via a display of a pedestrian client wireless device in use by a pedestrian client, a contemporaneous displaying of the driver validation code on the illuminated display, and the driver validation code on the display of the pedestrian client wireless device, and wherein the contemporaneous displayed driver validation codes visually match each other, thereby visually indicating a validation of the driver operating the DOV as being authorized to meet the pedestrian client carrying and using the pedestrian client wireless device outside of the DOV.

* * * * *